R. F. HAMILTON.
TROLLEY WIRE HANGER.
APPLICATION FILED AUG. 27, 1915.
1,219,732.
Patented Mar. 20, 1917.
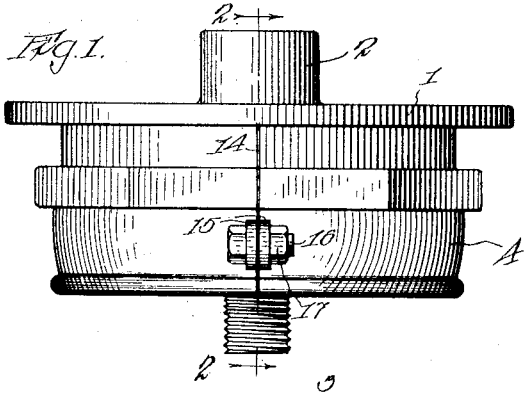
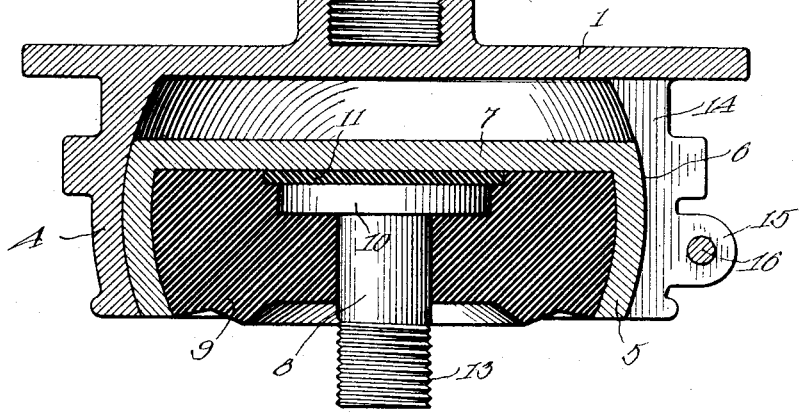
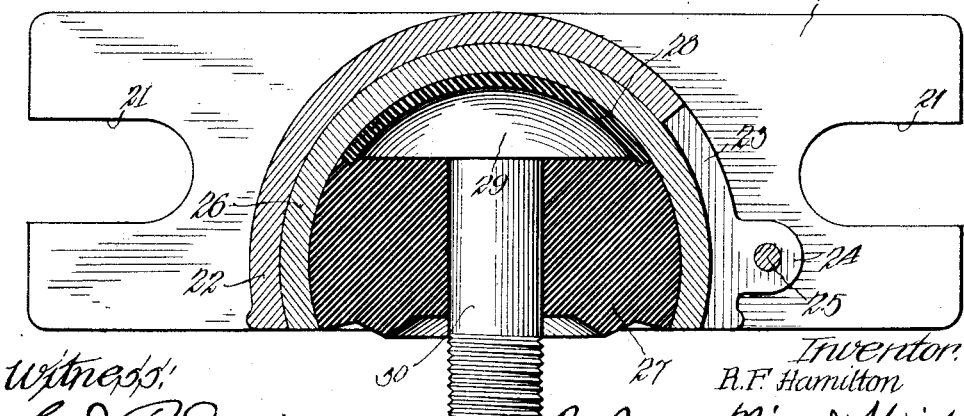
Inventor:
R. F. Hamilton
By Brown Nissen & Sprinkle
Attys.

UNITED STATES PATENT OFFICE.

ROBERT F. HAMILTON, OF WHEELING, WEST VIRGINIA.

TROLLEY-WIRE HANGER.

1,219,732.  Specification of Letters Patent.  Patented Mar. 20, 1917.

Application filed August 27, 1915. Serial No. 47,601.

*To all whom it may concern:*

Be it known that I, ROBERT F. HAMILTON, a citizen of the United States, residing at Wheeling, in the county of Ohio and State of West Virginia, have invented certain new and useful Improvements in Trolley-Wire Hangers, of which the following is a specification.

This invention relates to trolley wire hangers, and is especially adapted for use in connection with hangers for trolley lines in mines, but is in no way limited to such use, but is capable of application to trolley lines of all descriptions. The invention consists in the combination and arrangement of parts hereinafter described, shown in the accompanying drawings, and more particularly set forth in the appended claims.

In the drawings—

Figure 1 is an elevation of a trolley wire hanger embodying the present invention.

Fig. 2 is a vertical sectional view on line 2—2 of Fig. 1.

Fig. 3 is a vertical sectional view of another form of trolley wire hanger to which the present invention is applied.

Referring to Figs. 1 and 2 of the drawings, the numeral 1 designates an outer shell of metal which constitutes the supporting or body portion of the trolley wire hanger. Projecting from the central portion of the upper part of this shell is a suspension member 2, provided interiorly with screw threads 3, which, when the device is installed, are threaded upon the lower end of a suspension bolt secured to the overhead supporting structure. This overhead supporting structure may be the timbers of a mine, in which are inserted expansion bolts arranged to coöperate with the threads 3 of the supporting member 2. The hanger may be secured, however, in any other manner to overhead structures of various kinds. The lower portion of the shell 1 comprises a depending circular flange 4, having the interior surface thereof forming a portion of the interior surface of a hollow sphere, thus providing a socket for a ball and socket connection with a portion of the device connected directly with the trolley. Fitted inside the portion 4 of the shell 1 is a second shell 5, having the exterior surface 6 thereof shaped to fit the interior surface of the outer shell. The upper wall 7 of the shell 5 is spaced downwardly a distance from the upper wall of the shell 4 to leave room for rotation of the shell 5 within the shell 4.

A downwardly extending stud bolt 8 is located within the shell 5, and is held in place therein by insulation 9, preferably molded and of any suitable material, such as porcelain. Between the head 10 of the bolt 8 and the upper wall 7 of the shell 5 may be inserted a sheet of mica 11. In this way the bolt 8 is rigidly held in place within the shell 5, and is thoroughly insulated therefrom. The lower portion 13 of the bolt 8 is threaded to provide means for attaching a trolley wire clamp.

The outer casing or shell 4 has one side thereof split as at 14, and lugs 15 are located one on each side of the opening 14 in the shell 4. Each lug 15 is provided with an opening through which a bolt 16 passes, having a nut 17 thereon, which may be tightened to draw the lugs 15 together when it is desired to exert pressure upon the inner shell 5 to prevent movement of the shell 5 relative to the outer shell 4. The parts are so proportioned that when the nut 17 is loose on the bolt 16, the shell 5 moves freely within the shell 4 for adjustment of the stud bolt 8. After the stud bolt has been properly adjusted the nut 17 may be tightened, and the parts 4 and 5 will then be held in rigid position relative to one another.

In the forms of trolley hangers now in use in which the stud is secured rigidly to the shell, it frequently happens that the overhead structure is not exactly true, and the stud will thus be thrown out of vertical alinement. This is especially liable to be true in mine construction. When this happens the trolley wire clamp will also be out of vertical alinement, which results in the trolley wheel's striking the clamp and producing more or less sparking, depending on the amount of variation from true alinement of the clamp. This difficulty is entirely overcome by the present invention, since the stud 8 may be placed in true vertical alinement after the hanger has been secured to the overhead construction. This alinement is accomplished, as previously stated, by loosening the bolt 16, and moving the stud 8, together with the inner shell 5 and the insulating material, into proper position. The shape of the fitting portions of the shell provides a ball and socket connection between the inner and outer shells, thus permitting complete adjustment of the supporting stud. After adjustment of the stud the nut 17 is tightened on the bolt 6, thus drawing the portions of the outer shell 4 firmly about the inner shell, and holding the inner shell securely fastened in proper position with the stud bolt 8 in true vertical alinement. It is very important to provide this means for rigidly fastening the stud bolt after it has been adjusted, because otherwise vibrations of the trolley wheel or tangential tension on the wire where it passes around curves, will tend to move the stud and supported trolley wire clamp out of alinement, causing the rims of the trolley wheel to strike the clamp and produce sparking.

Fig. 3 shows a modification of the invention applied to a hanger intended to be secured to a vertical instead of an overhead support. The hanger shown in this figure is provided with a bracket member 20, having slots 21 therein, through which bolts or lag screws may pass for securing the bracket to an upright wall or other similar support. The bracket 20 has an arm projecting outwardly therefrom, and secured to the end of this arm is a hollow shell 22 shaped in the form of a portion of a sphere. The shell 22 has a slit 23 in one side thereof, and lugs 24, through which pass a bolt 25 for clamping the portions of the shell together in a manner similar to that of the outer shell of the form previously described. An inner hollow shell 26 is located within the shell 22, and has its outer surface shaped to fit the inner surface of the shell 22. A stud bolt 30 is positioned within the shell 26, and is held in place by insulation 27. A strip of mica 28 may be placed between the head 29 of the bolt 30 and the inner surface of the shell 26. In this way a depending supporting stud bolt is provided which may be adjusted into vertical alinement in a manner similar to that of the stud bolt in the form previously described.

It is, of course, understood that the invention may be embodied in many other forms, but it is believed that the two forms shown are sufficient to illustrate the principle and operation of the invention, and to enable those skilled in the art to make and use the same.

What I claim as new and desire to secure by Letters Patent is:

1. In combination, a trolley wire hanger comprising a securing member, a trolley wire supporting member, a universal joint connecting said members, means for holding said members rigid relative to one another, and means for insulating said members from one another.

2. A trolley wire hanger comprising a securing member, a supporting member, an adjustable connection between said members, means for insulating said members from one another and means for holding said members in rigid relation with one another.

3. A trolley wire hanger comprising a depending trolley wire supporting stud, a support for said stud means for adjusting said stud to bring it into vertical alinement, and means for insulating said stud from said support.

4. A trolley wire hanger comprising a depending trolley wire supporting stud, a universally adjustable member for supporting said stud, means for holding said member rigidly in position and insulating means for securing said stud to said member.

5. A trolley wire hanger comprising an outer hollow shell, a member positioned within said shell and movable relative thereto, means for securing said member rigidly relative to said shell, and a trolley wire support secured to said member and insulated therefrom.

6. In a trolley wire support, a member having an opening therein shaped in the form of a portion of a sphere, a second member positioned within said opening and shaped to fit the interior thereof to provide universal adjustment between said members, means for preventing relative movement of said members, means for securing one of said members to a supporting structure, and means for securing the other of said members to a trolley wire to be supported and means for insulating said members from one another.

7. In a trolley wire hanger, an outer shell having the inner surface thereof shaped in the form of a portion of a sphere and having one side thereof slitted, a trolley wire support fitted within said shell and movable therein, means for insulating said trolley wire support from said shell, and means for drawing together the slitted portions of said shell to rigidly clamp said trolley wire support relative thereto.

8. In a trolley wire support, an outer hollow shell having one side thereof slitted and having the interior thereof shaped in the form of a sphere, a second hollow shell fitted within said outer shell, a trolley wire support secured within said second shell and insulated therefrom, and means for drawing the slitted portions of said outer shell together to clamp said shell about said inner shell.

9. A trolley wire hanger comprising a ball and socket joint having two parts movable relative to one another, a depending trolley wire support secured to one of said parts and insulated therefrom, and means for clamping said parts rigidly to one another to prevent relative movement thereof.

10. In a trolley wire hanger, a ball and socket joint comprising an outer flange having the interior thereof shaped in the form of a portion of a sphere and having a diameter at the lower portion of said flange less than the greatest diameter of said sphere, a member fitted within said flange and held therein by said lower portion, a trolley wire support secured to said member, and means for securing said flange to a supporting structure.

11. In a trolley wire hanger, an outer cup-shaped shell having a slot therein to permit expansion and contraction thereof, an inner shell fitted to the interior of said outer shell and capable of universal movement relative thereto, a trolley wire supporting stud bolt, insulating material within said inner shell surrounding said stud bolt and holding said stud bolt in said shell and insulating it therefrom, and a clamping device for drawing the slitted portions of said outer shell together for clamping said outer shell rigidly about said inner shell.

12. In a trolley wire hanger, a ball and socket joint comprising an outer flange having the interior thereof shaped in the form of a portion of a sphere, a member fitted within said flange and held therein, a trolley wire support secured to said member, and means for securing said flange to a supporting structure.

13. In combination, a trolley wire hanger comprising a securing member consisting of two parts one within the other and connected together by means of a universal joint, insulation secured in the inner part, and a trolley supporting stud secured within said insulation.

14. A trolley wire hanger comprising an outer shell, an inner shell adjustably mounted within said outer shell, means for holding said shells in fixed relation to one another, molded insulation secured within said inner shell, a trolley wire supporting member having one end embedded in said insulation, and a layer of mica interposed between said headed end and the wall of said inner shell.

15. A trolley wire hanger comprising an outer shell having a spherically-shaped hollow interior, an inner shell fitted within said outer shell and movable therein, means for securing said shells in fixed relation to one another, molded insulation secured within said inner shell, a trolley wire supporting member having a headed end embedded within said insulation and having a threaded end projecting from said insulation, and a layer of mica interposed between said headed end and the wall of said inner wall.

In testimony whereof I have signed my name to this specification, in the presence of two subscribing witnesses, on this 20th day of August, A. D. 1915.

ROBERT F. HAMILTON.

Witnesses:
FRANK O'BRIEN,
GEO. J. JEFFERSON.

Copies of this patent may be obtained for five cents each, by addressing the "Commissioner of Patents, Washington, D. C."